Sept. 9, 1952          C. LILLY, SR          2,610,073
STABILIZER FOR FOUR-WHEELED VEHICLES
Filed Feb. 28, 1950
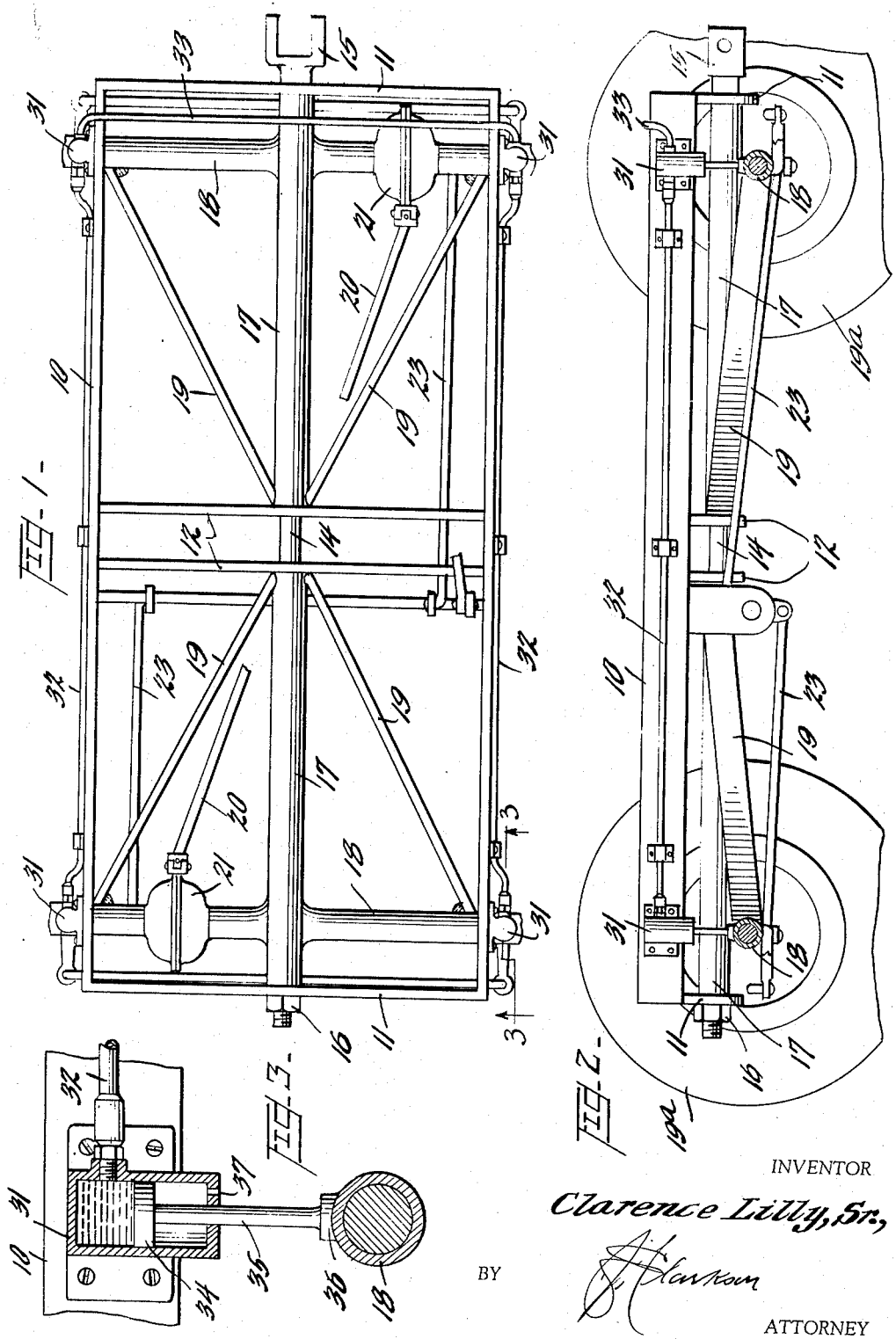
INVENTOR
*Clarence Lilly, Sr.,*
BY
ATTORNEY Patented Sept. 9, 1952

2,610,073

UNITED STATES PATENT OFFICE 2,610,073

STABILIZER FOR FOUR-WHEELED VEHICLES

Clarence Lilly, Sr., Lonoke, Ark., assignor, by mesne assignments, to Lilly Associates, Inc., Little Rock, Ark., a corporation of Arkansas Application February 28, 1950, Serial No. 146,779

3 Claims. (Cl. 280—104)

1

This invention relates to four-wheeled vehicles and has special reference to stabilizers for such vehicles.

In the passage of a four-wheeled vehicle over a rough surface there is a tendency, from time to time, for one wheel to rise or drop below the surface supporting the remaining three wheels. This causes a twisting stress to be placed on the frame of the vehicle unless compensation be made therefor. Furthermore, such passage over rough ground tends to produce unequal pressures of the wheels on the ground and thus to interfere with proper and uniform traction of all four wheels.

One important object of this invention is to provide equalizing means for a four-wheeled vehicle whereby the vehicle may travel over a rough surface without materially causing a twisting stress on the main frame of the vehicle.

A second important object of the invention is to provide such a vehicle with means whereby one of the wheels on a side of the vehicle may rise or drop without causing similar rising or dropping of that portion of the frame associated with such wheel.

A third important object of this invention is to provide, in a four-wheeled vehicle, equalizing means whereby the several wheels constantly engage the ground with equal pressures.

A fourth important object of the invention is to provide novel means for maintaining equal ground engaging pressures between the wheels on one side of the vehicle and the wheels on the other side of the vehicle.

With the above and other objects in view, as will be presently apparent, the invention consists in general of certain novel details of construction and combinations of parts hereinafter fully described, illustrated in the accompanying drawings and particularly claimed.

In the accompanying drawings like characters of reference indicate like parts in the several views, and:

Fig. 1 is a plan view of a form of the invention employing hydraulic equalizing means.

Fig. 2 is a side elevation partly in section of the form shown in Fig. 1, the wheels being omitted.

Fig. 3 is a detail section on the line 3—3 of Fig. 1.

In the embodiment shown in the drawings there is provided an upper or main frame. This main frame is preferably rigidly constructed and is of rectangular form having side members 10 and end members 11. The ends 11 may have

2 their bottom edges curved convexly downward so that they are deeper at their centers than at their lateral junctions with the sides. Spaced transverse braces 12 connect the sides 10 at their central portions and are shaped like the lower parts of the ends 11. Extending longitudinally of the frame through the lower parts of the ends 11 and of the braces 12 is a draw-bar 14 which projects through the ends and carries a clevis 15 at one end and a nut 16 at its other end. The draw-bar is thus held from moving longitudinally of the frame.

Between each frame end 11 and the adjacent cross brace 12 there is mounted revolubly on the draw-bar 14 a sleeve 17 and fixedly connected to each sleeve adjacent the respective frame end 11 is an axle housing 18. Radius rods 19 are welded or otherwise fixed in pairs to the sleeves at the sleeve ends adjacent the braces 12. Each pair of radius rods diverge from the attachment to the sleeve toward and fixed in an axle housing adjacent its ends. Each axle housing is thus firmly braced to a sleeve and is tiltable on the draw-bar 14. Axles (not shown) are driven by any suitable means here indicated in general by drive shafts 20 and differential housings 21. The engine (not shown) is mounted on the main frame and is suitably connected to the drive shafts.

Also a suitable form of steering gear may be used in connection with this invention. For instance, a steering wheel and shaft (not shown) may be connected by a linkage 23 with steering knuckles carried by the wheels 19a. The driving and steering arrangements may be of any desired form as they do not specifically affect the equalizing means soon to be described.

In the form of the invention here shown a hydraulic equalizing device is disclosed. For this purpose a cylinder 31 is mounted above each end of each axle housing 18 on the frame sides 10 adjacent their ends. The cylinders 31 at each side have their upper ends connected by longitudinally extending pipes or tubes 32 and at one end of the frame the cylinders 31 are cross-connected by a pipe or tube 33. In each cylinder is a piston 34 from which extends downwardly through the lower end of the cylinder a rod 35. The rods 35 are connected to the axle housings 18 as at 36. Vents 37 are formed in the lower ends of the cylinders 31. The upper parts of the cylinders 31 and the pipes or tubes 32 and 33 are filled with oil or other suitable liquid. In the form here shown if the right front wheel passes over a small obstruction that wheel will rise and the piston 34 will rise with it, the flood above the piston being forced out through the pipes 32 and 33. This will cause the pistons of the left front wheel and the right rear wheel to be depressed and the depression of these pistons will be in proportion to the depression of the piston of the right front wheel and thus the main frame will remain horizontal.

What is claimed is:

1. In a four-wheeled vehicle, a rigid frame having parallel end members, parallel side members and a pair of central frame braces extending parallel to the end members between the side members, a pair of rigid axle housings extending transversely beneath said frame at the front and rear of said frame, means tiltably connecting said axle housings and frame, said tiltable connection including a draw-bar extending longitudinally of said frame, sleeves revolubly mounted on the end portions of said draw-bar each having one end fixed to the center of a respective axle housing, each sleeve having its ends abutting respectively on a said end member and a said frame brace whereby longitudinal movement of the sleeves in the frame is prevented, and radius rods connecting the opposite end of each sleeve with the end portions of respective axle housings, wheel axles in said housings, ground wheels carried at the ends of said axles, and an equalizing device at each side of said frame and connecting the ends of the respective housing ends, said equalizing device including interconnected hydraulic pressure means connecting each end of each axle housing with said frame.

2. In a four-wheeled vehicle, a rigid frame having parallel end members, parallel side members and a pair of central frame braces extending parallel to the end members between the side members, a pair of rigid axle housings extending transversely beneath said frame at the front and rear of said frame, means tiltably connecting said axle housings and frame, said tiltable connection including a draw-bar extending longitudinally of said frame, sleeves revolubly mounted on the end portions of said draw-bar each having one end fixed to the center of a respective axle housing, each sleeve having its ends abutting respectively on a said end member and a said frame brace whereby longitudinal movement of the sleeves in the frame is prevented, and radius rods connecting the opposite end of each sleeve with the end portions of respective axle housings, wheel axles in said housings, ground wheels carried at the ends of said axles, and an equalizing device at each side of said frame and connecting the ends of the respective housing ends, said equalizing means including a pair of hydraulic cylinders fixed to said frame on each side of the frame and located above respective ends of the axle housings, pistons in said cylinders, piston rods extending downward from said pistons and having connection with the housing ends, and hydraulic piping connecting the cylinders at each of the frame sides.

3. In a four-wheeled vehicle, a rigid frame having parallel end members, parallel side members and a pair of central frame braces extending parallel to the end members between the side members, a pair of rigid axle housings extending transversely beneath said frame at the front and rear of said frame, means tiltably connecting said axle housings and frame, said tiltable connection including a draw-bar extending longitudinally of said frame, sleeves revolubly mounted on the end portions of said draw-bar each having one end fixed to the center of a respective axle housing, each sleeve having its ends abutting respectively on a said end member and a said frame brace whereby longitudinal movement of the sleeves in the frame is prevented, and radius rods connecting the opposite end of each sleeve with the end portions of respective axle housings, wheel axles in said housings, ground wheels carried at the ends of said axles, and an equalizing device at each side of said frame and connecting the ends of the respective housing ends, said equalizing means including a pair of hydraulic cylinders fixed to said frame on each side of the frame and located above respective ends of the axle housings, pistons in said cylinders, piston rods extending downward from said pistons and having connection with the housing ends, hydraulic piping connecting the cylinders at each of the frame sides, and a hydraulic pipe connecting the cylinders at one end of the frame.

CLARENCE LILLY, Sr.

REFERENCES CITED

The following references are of record in the file of this patent:

UNITED STATES PATENTS

| Number | Name | Date |
| --- | --- | --- |
| 1,344,334 | Croonholm | June 22, 1920 |
| 1,847,252 | Miller | Mar. 1, 1932 |
| 2,105,553 | Schroter et al. | Jan. 18, 1938 |
| 2,139,178 | Stevens | Dec. 6, 1938 |
| 2,154,463 | Littman | Apr. 18, 1939 |
| 2,249,402 | Stefano | July 15, 1941 |
| 2,506,395 | Straub | May 2, 1950 |